United States Patent
Chiu et al.

(10) Patent No.: US 11,081,959 B2
(45) Date of Patent: Aug. 3, 2021

(54) POWER CONVERSION DEVICE

(71) Applicant: Chicony Power Technology Co., Ltd., New Taipei (TW)

(72) Inventors: Jung-Ching Chiu, New Taipei (TW); Chien-Lung Liu, New Taipei (TW); You-Chen Kuo, New Taipei (TW)

(73) Assignee: Chicony Power Technology Co., Ltd., New Taipei (TW)

(*) Notice: Subject to any disclaimer, the term of this patent is extended or adjusted under 35 U.S.C. 154(b) by 0 days.

(21) Appl. No.: 16/748,687

(22) Filed: Jan. 21, 2020

(65) Prior Publication Data

US 2021/0135572 A1    May 6, 2021

(30) Foreign Application Priority Data

Oct. 31, 2019    (TW) ................................. 108139407

(51) Int. Cl.
*H02M 3/158*    (2006.01)
*H02M 1/36*    (2007.01)

(52) U.S. Cl.
CPC ......... *H02M 3/158* (2013.01); *H02M 3/1584* (2013.01); *H02M 1/36* (2013.01)

(58) Field of Classification Search
CPC . H02M 2001/0009; H02M 2001/0083; H02M 1/32; H02M 1/36; H02M 1/38; H02M 1/385; H02M 3/156; H02M 3/158; H02M 3/1582; H02M 3/1584
See application file for complete search history.

(56) References Cited

U.S. PATENT DOCUMENTS

| | | | |
|---|---|---|---|
| 6,504,497 B2 | 1/2003 | Jang et al. | |
| 9,024,609 B2 | 5/2015 | Milavec | |
| 9,479,045 B1* | 10/2016 | Wang | H02M 7/04 |
| 9,735,692 B1* | 8/2017 | Lu | H02M 3/28 |
| 10,270,329 B2 | 4/2019 | Karlsson et al. | |
| 2005/0036337 A1* | 2/2005 | Zhang | H02M 3/1584 363/17 |

(Continued)

FOREIGN PATENT DOCUMENTS

| CN | 1701482 | 11/2005 |
|---|---|---|
| CN | 100541991 | 9/2009 |

(Continued)

OTHER PUBLICATIONS

"Office Action of Taiwan Counterpart Application", dated Aug. 3, 2020, p. 1-p. 4.

*Primary Examiner* — Matthew V Nguyen
(74) *Attorney, Agent, or Firm* — JCIPRNET

(57) ABSTRACT

A power conversion device is provided. The power conversion device includes a path module and a control module. The path module includes a first path and a second path. The control module generates a first control signal for controlling the first path and a second control signal for controlling the second path. When an input voltage value received by the path module is less than a first threshold and a boosting operation is performed for the first time, the control module generates the first control signal to interrupt the first path to stop outputting the input power, and adjusts a duty cycle of the second control signal to a first duty cycle based on an input current value and the input voltage value, so as to stabilize an output voltage value.

9 Claims, 7 Drawing Sheets

(56) References Cited

U.S. PATENT DOCUMENTS

| | | | | |
|---|---|---|---|---|
| 2006/0006850 A1* | 1/2006 | Inoue | ............... | H02J 2207/20 |
| | | | | 323/265 |
| 2010/0097041 A1* | 4/2010 | Ayukawa | ............. | H02M 7/23 |
| | | | | 323/272 |
| 2010/0226149 A1* | 9/2010 | Masumoto | ......... | H02M 1/4225 |
| | | | | 363/20 |
| 2013/0051101 A1 | 2/2013 | Cao et al. | | |
| 2015/0303815 A1* | 10/2015 | Chen | ............... | H02M 7/4837 |
| | | | | 363/21.04 |
| 2017/0034881 A1 | 2/2017 | Lin et al. | | |

FOREIGN PATENT DOCUMENTS

| | | |
|---|---|---|
| CN | 102386773 | 1/2014 |
| CN | 103580272 | 2/2014 |
| CN | 106329935 | 1/2017 |
| TW | 201328160 | 7/2013 |
| TW | 201509103 | 3/2015 |
| TW | I481152 | 4/2015 |
| TW | I565200 | 1/2017 |
| TW | I600997 | 10/2017 |

\* cited by examiner

POWER CONVERSION DEVICE

CROSS-REFERENCE TO RELATED APPLICATION

This application claims the priority benefit of Taiwan application serial no. 108139407, filed on Oct. 31, 2019. The entirety of the above-mentioned patent application is hereby incorporated by reference herein and made a part of this specification.

BACKGROUND

1. Technical Field

The disclosure relates to a power conversion device, and in particular, to a power conversion device configured to maintain an output voltage value.

2. Description of Related Art

Generally, a power converter receives an input power and converts the input power to generate an output power. When a voltage value of the input power decreases, a voltage value of the output power also decreases. Therefore, to maintain the voltage value of the output power when the voltage value of the input power is insufficient, the power converter may maintain the voltage value of the output power at a preset voltage level within a certain duration through a feedback mechanism. As such, an electronic device connected to the power converter can complete operations such as data storage and mechanism restoration within the foregoing duration.

FIG. 1 is a schematic waveform diagram of an input voltage value and an output voltage value of a boost circuit of a conventional power conversion device. Actually, when an input voltage value Vin of the input power decreases, a boost inductor inside the boost circuit does not have any inductance current at the beginning of enabling the boost circuit. Therefore, an output voltage value Vout of the output power is not boosted until a current value of the inductance current reaches a required current value. However, the inductance current continuously increases even when the output voltage value Vout is boosted to an expected voltage level, resulting in an excessively high output voltage value Vout of the output power. Therefore, the boost circuit causes the output voltage value Vout to be fluctuating, and consequently, the output voltage value Vout cannot be effectively maintained at a voltage level.

SUMMARY

The disclosure provides a power conversion device configured to stably maintain, when an input voltage value of an input power decreases, an output voltage value of an output power to be in a voltage value range within a period of time.

The power conversion device in the disclosure includes a path module and a control module. The path module is configured to receive an input power and provide an output power. The path module includes a first path and a second path. The second path is connected to the first path in parallel. The control module is coupled to the path module. The control module is configured to detect the input power and the output power and generate, based on at least two of an input voltage value and an input current value of the input power and an output voltage value of the output power, a first control signal used to control the first path and a second control signal used to control the second path. The first path and the second path are not simultaneously conducted. When the input voltage value received by the path module is less than a first threshold and a boosting operation is performed for the first time, the control module generates the first control signal to interrupt the first path to stop outputting the input power, and adjusts a duty cycle of the second control signal to a first duty cycle based on the input current value and the input voltage value, so as to stabilize the output voltage value. When a duration for which the duty cycle of the second control signal is maintained to be the first duty cycle is greater than or equal to a maintenance duration, the control module adjusts the second control signal to stop operation of the second path.

Based on the foregoing, when the input voltage value of the input power received by the power conversion device is less than the first threshold and the boosting operation is performed for the first time, the first control signal is generated to interrupt the first path to stop outputting the input power. The duty cycle of the second control signal is adjusted to the first duty cycle based on the input current value and the input voltage value. In this way, the power conversion device is capable of stably maintaining, when the input voltage value of the input power decreases, the output voltage value of the output power to be in a voltage value range within a period of time.

To make the foregoing features and advantages of the disclosure clearer and more comprehensible, embodiments accompanied with figures are described in detail below.

DESCRIPTION OF THE EMBODIMENTS

Figure 1:
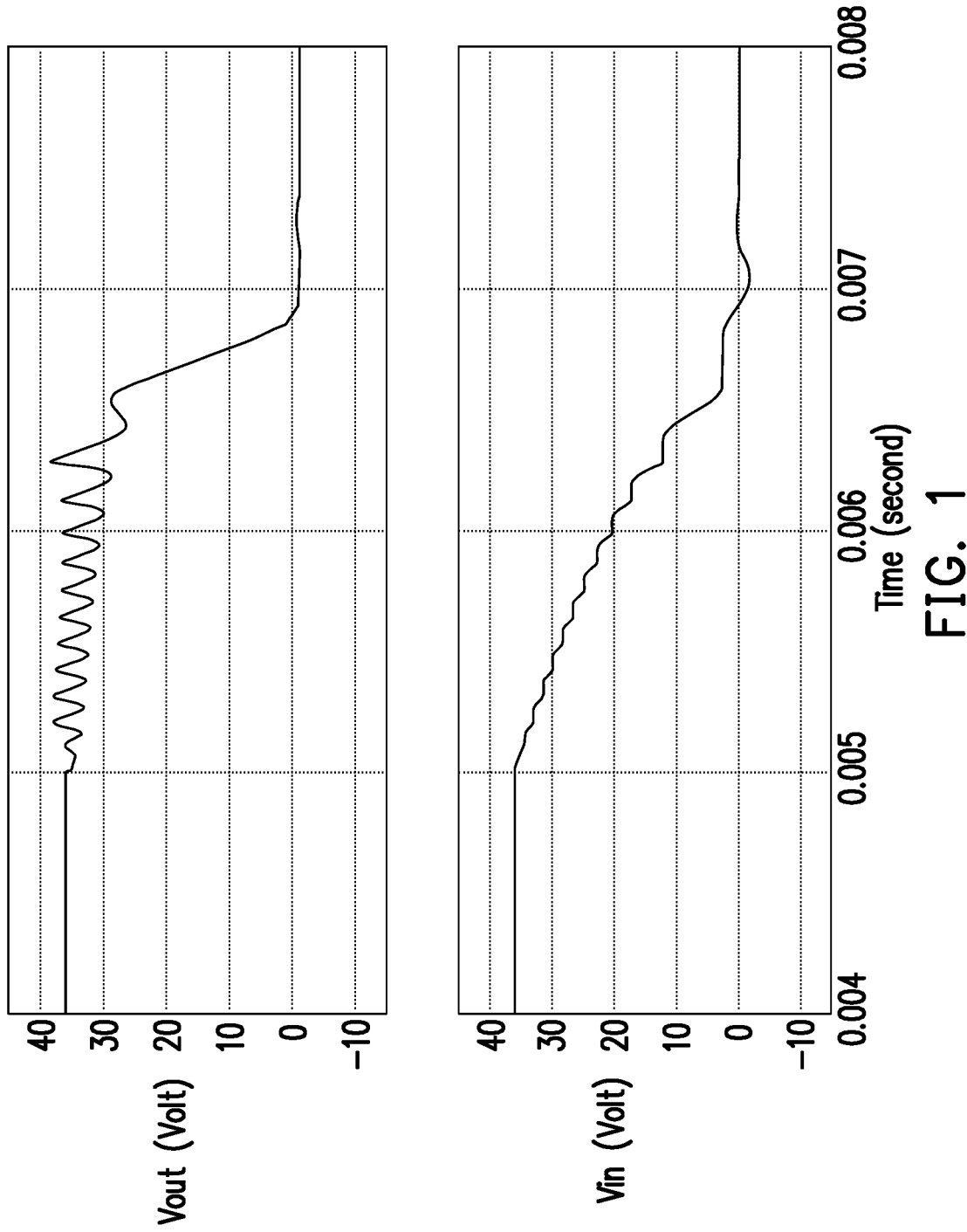
FIG. 1 is a schematic waveform diagram of an input voltage value and an output voltage value of a boost circuit of a conventional power conversion device.
Figure 2:
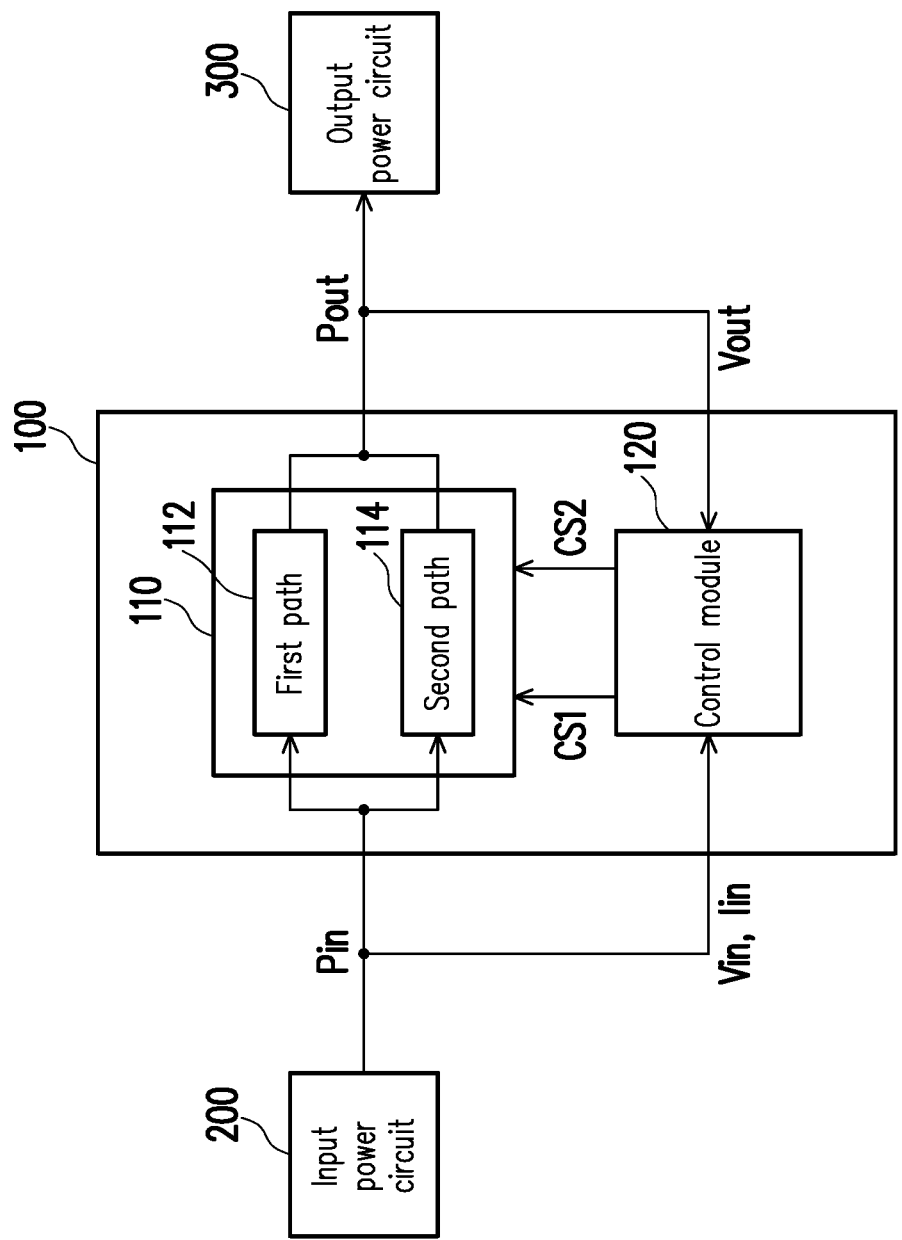
FIG. 2 is a schematic block diagram of functions of a power conversion device according to an embodiment of the disclosure.

FIG. 2 is a schematic block diagram of functions of a power conversion device according to an embodiment of the disclosure. In the present embodiment, the power conversion device 100 may be coupled between an input power circuit 200 and an output power circuit 300. The power conversion device 100 is configured to receive an input power Pin of the input power circuit 200 and provide an output power Pout to the output power circuit 300. The input power circuit 200 may be a circuit at least including at least one of a filter unit and a surge current protection unit. The output power circuit 300 may be a circuit at least including a direct current voltage conversion unit. In the present embodiment, the power conversion device 100 includes a path module 110 and a control module 120. The path module 110 receives the input power Pin and provides the output power Pout. The path module 110 includes a first path 112 and a second path 114 that are connected in parallel.

In the present embodiment, the control module 120 is coupled to the path module 110. The control module 120 detects the input power Pin and the output power Pout, and generates a first control signal CS1 and a second control signal CS2 based on at least two of an input voltage value Vin and an input current value Iin of the input power Pin and an output voltage value Vout of the output power Pout. The first control signal CS1 is used to control the first path 112. The second control signal CS2 is used to control the second path 114. In the present embodiment, based on control of the first control signal CS1 and the second control signal CS2, the first path 112 and the second path 114 are not simultaneously conducted. When the input voltage value Vin received by the path module 110 is greater than or equal to a first threshold, it indicates that the input voltage value Vin is sufficient. Therefore, the control module 120 generates the first control signal CS1 to conduct the first path 112, and generates the second control signal CS2 to disconnect the second path 114. As such, when the input voltage value Vin is sufficient, the power conversion device 100 can output the input power Pin through the first path 112.

In another aspect, when the input voltage value Vin received by the path module 110 is less than the first threshold, it indicates that the input voltage value Vin is insufficient. Therefore, when the input voltage value Vin received by the path module 110 is less than the first threshold and a boosting operation is performed for the first time, the control module 120 generates the first control signal CS1 to interrupt the first path 112 to stop outputting the input power Pin, so as to prevent the input power Pin from being output through the first path 112. The control module 120 also adjusts a duty cycle of the second control signal CS2 to a first duty cycle based on the input current value Iin and the input voltage value Vin. In this way, the power conversion device 100 controls, by using the second control signal CS2 having the first duty cycle, the second path 114 to stabilize the output voltage value Vout.

In addition, the control module 120 can also time a duration for which the duty cycle of the second control signal CS2 is maintained to be the first duty cycle. When the duration for which the duty cycle of the second control signal CS2 is maintained to be the first duty cycle is greater than or equal to the maintenance duration, the control module 120 adjusts the second control signal CS2 to stop operation of the second path 114, so as to reduce unnecessary power output.

Figure 3:
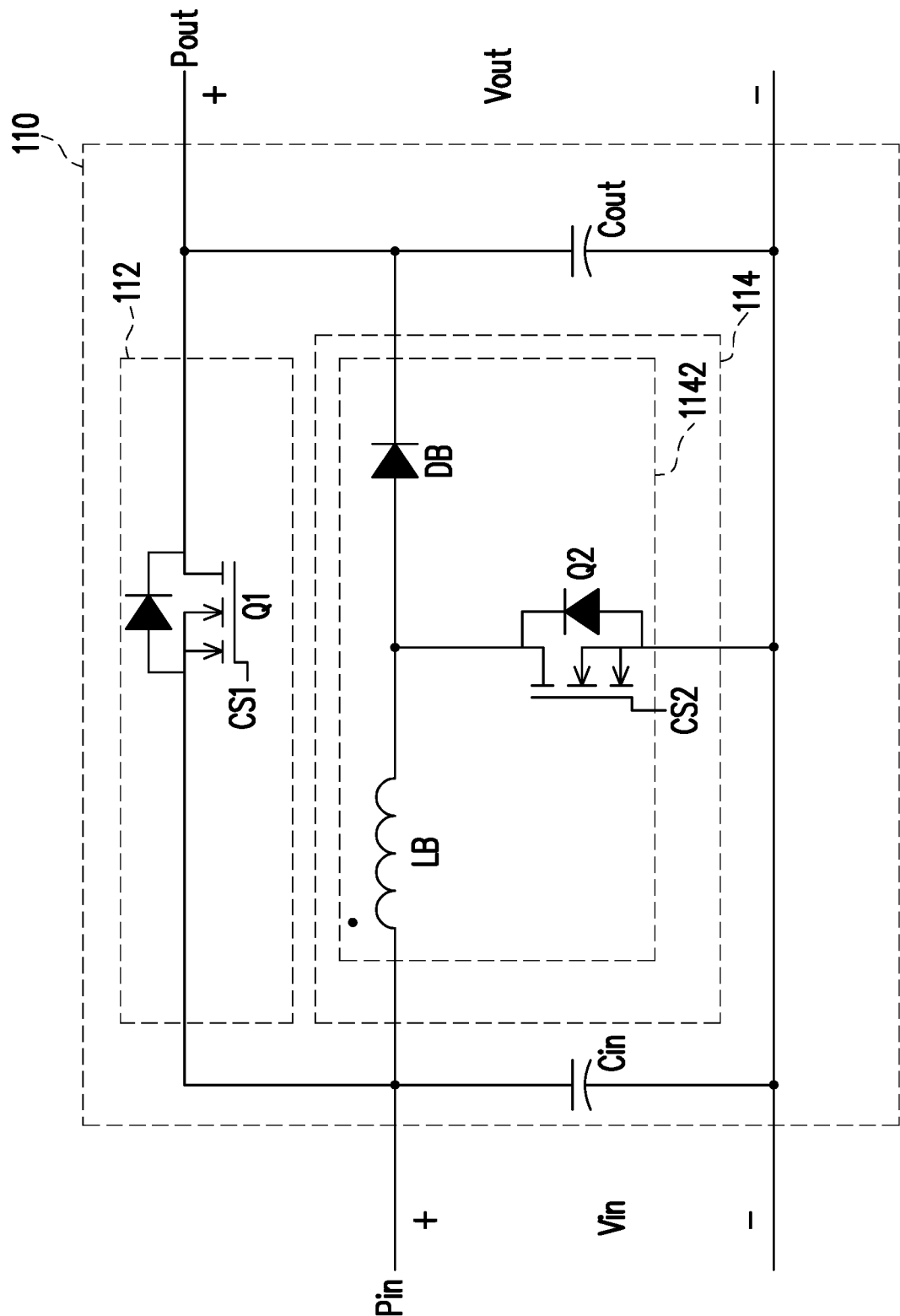
FIG. 3 is a schematic circuit diagram of a path module according to an embodiment of the disclosure.

Referring to FIG. 2 and FIG. 3 together, FIG. 3 is a schematic circuit diagram of a path module according to an embodiment of the disclosure. In the present embodiment, the first path 112 of the path module 110 includes a switch element Q1. A first end of the switch element Q1 is configured to receive the input power Pin. A second end of the switch element Q1 is configured to provide the output power Pout. A control end of the switch element Q1 is configured to receive the first control signal CS1. The switch element Q1 is switched on or off based on the first control signal CS1. For instance, the path module 110 may include an input capacitor Cin configured to store the input voltage value Vin and an output capacitor Cout configured to store the output voltage value Vout. The first end of the switch element Q1 is also coupled to the input capacitor Cin to receive the input voltage value Vin. The second end of the switch element Q1 is also configured to provide the output voltage value Vout to the output capacitor Cout.

In the present embodiment, when the switch element Q1 is switched on based on the first control signal CS1, the output voltage value Vout is substantially the same as the input voltage value Vin. In this case, the output power Pout is substantially the same as the input power Pin. When the switch element Q1 is switched off based on the first control signal CS1, the first path 112 of the path module 110 is disconnected. The first path 112 stops outputting the input power Pin.

In the present embodiment, the second path 114 of the path module 110 includes at least a boost circuit 1142. The boost circuit 1142 is connected to the switch element Q1 in parallel. The boost circuit 1142 includes a boost inductor LB, a boost diode DB, and a boost switch Q2. A first end of the boost inductor LB is coupled to the first end of the switch element Q1 and the input capacitor Cin to receive the input voltage value Vin. An anode of the boost diode DB is coupled to a second end of the boost inductor LB. A cathode of the boost diode DB is coupled to the second end of the switch element Q1. The cathode of the boost diode DB is also used as an output end of the boost circuit 1142, so as to provide the output voltage value Vout to the output capacitor Cout. A first end of the boost switch Q2 is coupled to the anode of the boost diode DB. A second end of the boost switch Q2 is coupled to a reference low potential (for instance, coupled to the ground.) A control end of the boost switch Q2 is configured to receive the second control signal CS2. Therefore, the boost circuit 1142 is configured to operate based on the duty cycle of the second control signal CS2.

Figure 4:
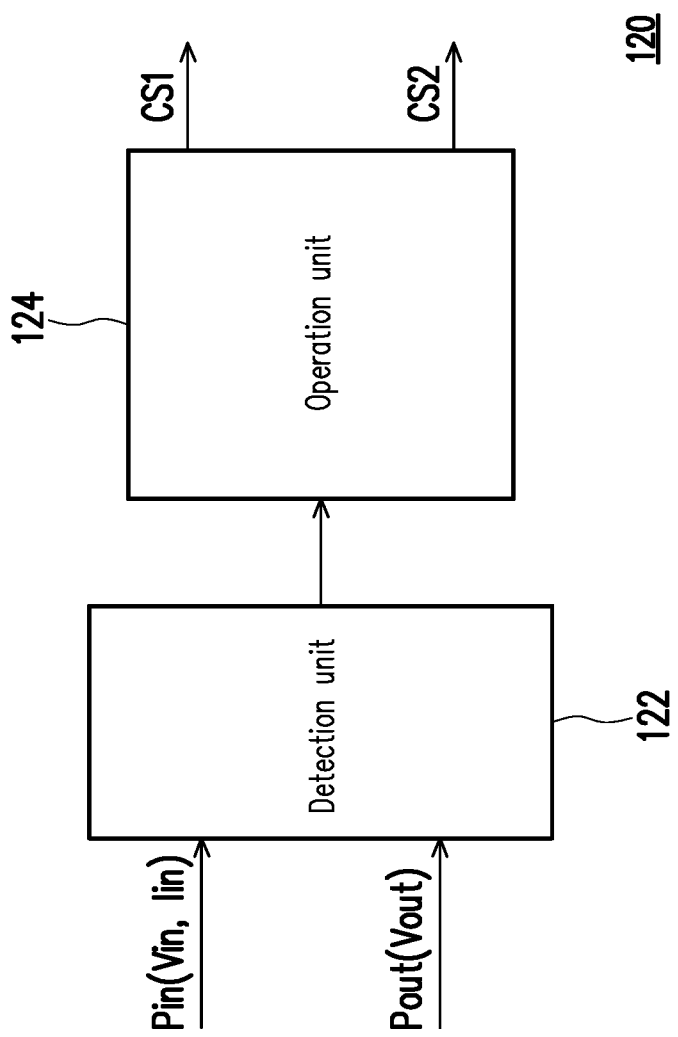
FIG. 4 is a schematic circuit diagram of a control module according to an embodiment of the disclosure.

Referring to FIG. 2 and FIG. 4 together, FIG. 4 is a schematic circuit diagram of a control module according to an embodiment of the disclosure. In the present embodiment, the control module 120 includes a detection unit 122 and an operation unit 124. The detection unit 122 detects the input power Pin and the output power Pout. The detection unit 122 obtains the input voltage value Vin, the input current value Iin, and the output voltage value Vout based on a detection result of the input power Pin and the output power Pout. The operation unit 124 is coupled to the detection unit 122. The operation unit 124 generates the first control signal CS1 based on the input voltage value Vin. In addition, the operation unit 124 also calculates the first duty cycle, a second duty cycle, and a third duty cycle of the second control signal CS2 based on at least two of the input voltage value Vin, the input current value Iin, and the output voltage value Vout.

Figure 5:
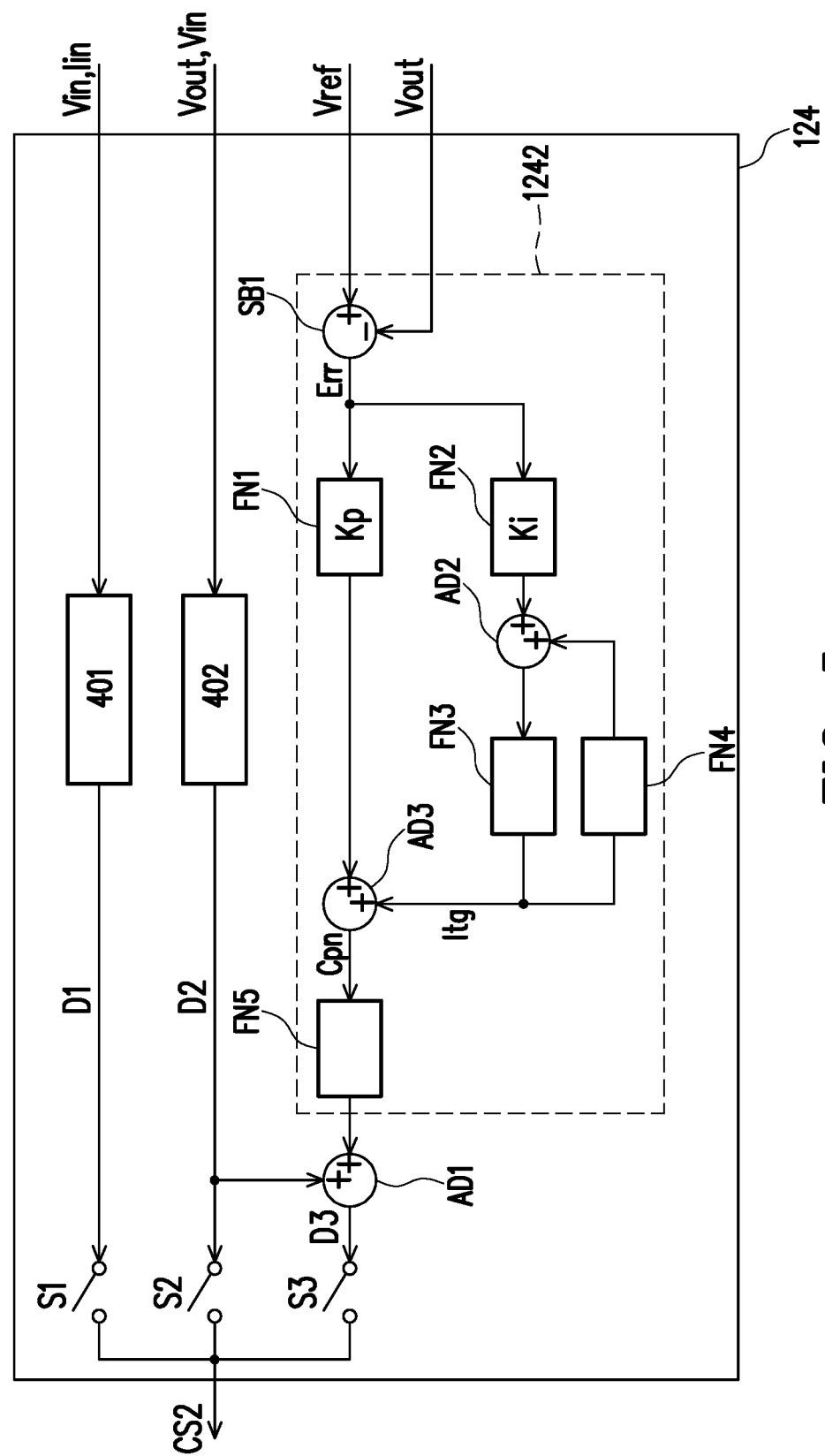
FIG. 5 is a schematic diagram of an operation unit according to an embodiment of the disclosure.

For further descriptions, referring to FIG. 4 and FIG. 5 together, FIG. 5 is a schematic diagram of an operation unit according to an embodiment of the disclosure. In addition to generating the first control signal CS1, the operation unit 124 further calculates the first duty cycle D1 of the second control signal CS2 through operation, and calculates the second duty cycle D2 of the second control signal CS2 through operation. The operation unit 124 may be, for instance, a central processing unit (CPU), or another programmable general-purpose or dedicated microprocessor, a digital signal processor (DSP), a programmable controller, an application-specific integrated circuit (ASIC), a programmable logic device (PLD), or other similar devices, or a combination thereof. The operation unit 124 can load and execute a computer program. In the present embodiment, the operation unit 124 calculates, according to a formula (1), the first duty cycle D1 by using a first duty cycle generator 401.

$$D1 = Iin \times L / Vin \qquad \text{formula (1)}$$

D1 is the first duty cycle, and L is an inductance value of a boost inductor (for instance, the boost inductor LB in FIG. 3). It can be learned that, the first duty cycle generator 401 performs a multiplication operation on the input current value Iin and the inductance value of the boost inductor to obtain an operation result, and performs a division operation on the operation result and the input voltage value Vin to generate the first duty cycle D1. In other words, a quotient of the operation result and the input voltage value Vin is equal to the first duty cycle D1.

The operation unit 124 obtains, according to a formula (2), the second duty cycle D2 by using a second duty cycle generator 402.

$$D2 = 1 - (Vin/Vout) \qquad \text{formula (2)}$$

D2 is the second duty cycle. It can be learned that, the second duty cycle generator 402 performs a division operation on a constant value of the input voltage value Vin and a constant value of the output voltage value Vout to obtain an input-output ratio, and subtracts the input-output ratio from 1 to obtain the second duty cycle D2.

In the present embodiment, the operation unit 124 further includes selector switches S1 and S2. The operation unit 124 switches on the selector switch S1 to output the first duty cycle D1 or switches off the selector switch S1 to stop outputting the first duty cycle D1. The operation unit 124 switches on the selector switch S2 to output the second duty cycle D2 or switches off the selector switch S2 to stop outputting the second duty cycle D2. In the present embodiment, the selector switches S1 and S2 are not simultaneously switched on.

In the present embodiment, the operation unit 124 further includes a compensation unit 1242 and an adder AD1. The operation unit 124 further generates the third duty cycle D3 of the second control signal CS2 by using the second duty cycle D2, the compensation unit 1242, and the adder AD1. In the present embodiment, the compensation unit 1242 receives the output voltage value Vout and a reference voltage value Vref. The reference voltage value Vref may be set to be equal to the first threshold or close to the first threshold (which should not be construed as a limitation in the disclosure). The compensation unit 1242 generates an error value Err based on the output voltage value Vout and the reference voltage value Vref, and performs a multiplication operation on the error value Err and a proportional parameter Kp to obtain a proportional value. The compensation unit 1242 performs a multiplication operation on the error value Err and an integral parameter Ki to obtain an operation value, and accumulates the operation value over time to obtain an integral value Itg. The compensation unit 1242 adds the proportional value and the integral value Itg to provide a compensation value Cpn. Subsequently, the operation unit 124 compensates for the second duty cycle D2 based on the compensation value Cpn to obtain the third duty cycle D3.

For instance, in the present embodiment, the compensation unit 1242 includes a subtractor SB1, functions FN1, FN2, FN3, FN4, and FN5, and adders AD2 and AD3. The compensation unit 1242 performs subtractive operation on the reference voltage value Vref and the output voltage value Vout by using the subtractor SB1, so as to generate the error value Err. The error value Err is a difference obtained by subtracting the output voltage value Vout from the reference voltage value Vref. The compensation unit 1242 performs a multiplication operation on the error value Err and the proportional parameter Kp by using the function FN1 to obtain the proportional value. The function FN1 may be, for instance, a multiplier performing a multiplication operation on the error value Err. The compensation unit 1242 performs a multiplication operation on the error value Err and the integral parameter Ki by using the function FN2 to obtain the operation value. The function FN2 may be, for instance, a multiplier performing a multiplication operation on the error value Err. The compensation unit 1242 accumulates the operation value over time by using the adder AD3 and the functions FN3 and FN4 to obtain the integral value Itg. The compensation unit 1242 adds the proportional value and the integral value Itg to provide the compensation value Cpn. In the present embodiment, the function FN3 may be used to limit the integral value Itg, so that the integral value Itg is limited to a first range. The function FN4 may be, for instance, the integral value Itg that is previously limited to the first range, so as to provide an accumulation result of the integral value Itg. The adder AD2 may accumulate over time the accumulation result provided by the function FN4 for the operation value provided by the function FN2 to generate the integral value Itg. The compensation unit 1242 adds the proportional value and the integral value Itg by using the adder AD3 to provide the compensation value Cpn. In the present embodiment, the function FN5 may be used to limit the compensation value Cpn, so that the compensation value Cpn is limited to a second range. The functions FN1, FN2, FN3, FN4, and FN5 in the present embodiment may be, for instance, implemented by using an operation circuit or an operation program. The compensation unit 1242 in the present embodiment may be implemented by using a proportional-integral (PI) controller or a proportional-integral-differential (PID) controller. In the present embodiment, the compensation unit 1242 is operated at a low frequency (for instance, at 10 Hz to 100 Hz) to generate the compensation value Cpn, so that the compensation value Cpn does not drastically change.

In the present embodiment, the operation unit 124 adds the compensation value Cpn limited to the second range and the second duty cycle D2 by using the adder AD1 to obtain the third duty cycle D3. In the present embodiment, when the output voltage value Vout is greater than the reference voltage value Vref, the error value Err is less than 0. Therefore, the third duty cycle D3 is less than the second duty cycle D2. The output voltage value Vout decreases. In another aspect, when the output voltage value Vout is less than the reference voltage value Vref, the error value Err is greater than 0. Therefore, the third duty cycle D3 is greater than the second duty cycle D2. The output voltage value Vout increases.

In the present embodiment, a selector switch S3 is coupled between the adder AD1 and an output end of the operation unit 124. The operation unit 124 further controls the selector switches S1 to S3 to provide one of the first duty cycle D1, the second duty cycle D2, and the third duty cycle D3, or not to provide the first duty cycle D1, the second duty cycle D2, or the third duty cycle D3. In other words, at least two of the selector switches S1 to S3 are not switched on simultaneously.

Figure 6:
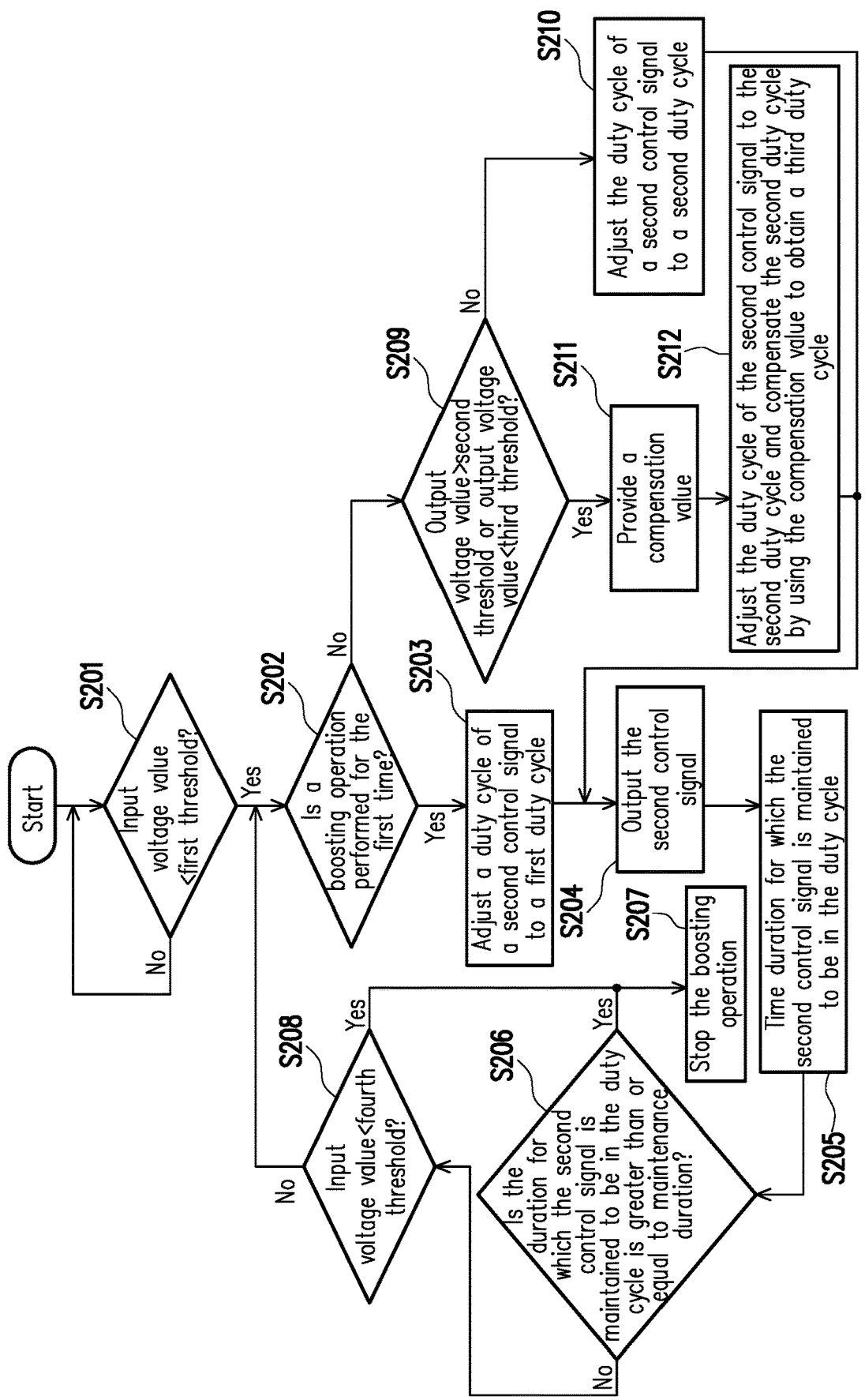
FIG. 6 is an operation flowchart of a power conversion device according to an embodiment of the disclosure.

Referring to FIG. 2, FIG. 4, and FIG. 6 together, FIG. 6 is an operation flowchart of a power conversion device according to an embodiment of the disclosure. In the present embodiment, when the power conversion device 100 is started, the power conversion device 100 starts to determine, in step S201, whether the input voltage value Vin received by the path module 110 is less than the first threshold (for instance, 40 volts, which should however not be construed as a limitation in the disclosure). When the power conversion device 100 determines that the input voltage value Vin is less than the first threshold, the operation procedure turns to step S202 to prepare to perform a boosting operation. In another aspect, when the power conversion device 100 determines that the input voltage value Vin is greater than or equal to the first threshold, the operation procedure returns to step S201. In the present embodiment, when the input voltage value Vin is greater than or equal to the first threshold, the control module 120 conducts the first path 112 by using the first control signal CS1 and stops operation of the second path 114 by using the second control signal CS2, to output the input power Pin through the first path 112.

In step S202, the power conversion device 100 determines whether the boosting operation is performed for the first time. In the present embodiment, the power conversion device 100 may store a status flag. When the power conversion device 100 is started, the status flag stores a first flag value, for instance, "0". After the power conversion device 100 performs the boosting operation for the first time, the status flag stores a second flag value, for instance, "1". Therefore, in step S202, the power conversion device 100 may determine, based on the status flag, whether the boosting operation is performed for the first time.

When the power conversion device 100 determines that the boosting operation is performed for the first time, the operation procedure turns to step S203. In step S203, the power conversion device 100 adjusts the duty cycle of the second control signal CS2 to the first duty cycle by using the control module 120. In the present embodiment, the first duty cycle may be generated by using the operation unit 124 of the control module 120. In other words, the first duty cycle is generated by the first duty cycle generator 401 according to the foregoing formula (1). After the power conversion device 100 adjusts the duty cycle of the second control signal CS2 to the first duty cycle, the operation procedure turns to step S204.

In step S204, the power conversion device 100 provides the second control signal CS2 by using the control module 120. Therefore, in step S201 and S202, when the input voltage value Vin received by the path module 110 is less than the first threshold and the boosting operation is performed for the first time, the power conversion device 100 adjusts, in step 203, the duty cycle of the second control signal CS2 to the first duty cycle by using the control module 120, and outputs, in step S204, the second control signal CS2 to the path module 110 by using the control module 120, so as to start to perform the boosting operation for the first time. In addition, the control module 120 generates the first control signal CS1 to disconnect the first path 112.

The power conversion device 100 times, in step S205, a duration for which the second control signal CS2 is maintained to be in a specific duty cycle, and determines, in step S206 based on a timing result, whether the duration for which the second control signal CS2 is maintained to be in the specific duty cycle is greater than or equal to preset a maintenance duration. The maintenance duration may be set to 4 milliseconds, which should not be construed as a limitation in the disclosure. The maintenance duration is a basis used to determine whether the boosting operation is stopped. The maintenance duration may be adjusted according to a design requirement. Based on the operation procedure of the foregoing steps S201 to S204, the power conversion device 100 times, in step S205, a duration for which the second control signal CS2 is maintained to be in the first duty cycle, and determines, in step S206 based on a timing result, whether the duration for which the second control signal CS2 is maintained to be in the first duty cycle is greater than or equal to the maintenance duration. When the duration for which the second control signal CS2 is maintained to be in the first duty cycle is greater than or equal to the maintenance duration, it indicates that the foregoing duration has reached the preset maintenance duration. Therefore, the power conversion device 100 stops, in step S207, operation of the second path 114, so as to stop the boosting operation.

In another aspect, in step S206, when the duration for which the second control signal CS2 is maintained to be in the first duty cycle is shorter than (less than) the maintenance duration, it indicates that the foregoing duration has not reached the preset maintenance duration. Therefore, when the duration for which the second control signal CS2 is maintained to be in the first duty cycle is shorter than the maintenance duration, the power conversion device 100 further determines, in step S208, whether the input voltage value Vin is less than a fourth threshold (for instance, 10 volts, which should however not be construed as a limitation in the disclosure).

In step S208, the power conversion device 100 further determines whether the input voltage value Vin is less than the fourth threshold. When the input voltage value Vin is determined to be less than the fourth threshold, it indicates that the input voltage value Vin is excessively low. Therefore, when the power conversion device 100 determines that the input voltage value Vin is less than the fourth threshold, the operation procedure turns to step S207 to stop operation of the second path 114. In another aspect, when the power conversion device 100 determines that the input voltage value Vin is greater than or equal to the fourth threshold, the operation procedure returns to step S202. In the present embodiment, once the operation procedure returns to step S202, the status flag stores the second flag value, for instance, "1".

In step S202, when the input voltage value Vin received by the path module 110 is less than the first threshold and the boosting operation is not performed for the first time, the power conversion device 100 determines, in step S209, the output voltage value Vout by using the control module 120. In the present embodiment, the control module 120 compares the output voltage value Vout with a second threshold, and compares the output voltage value Vout with a third threshold. The second threshold is greater than the third threshold. The first threshold is less than the second threshold and is greater than the third threshold. For instance, the first threshold is 40 volts, the second threshold is 42 volts, and the third threshold is 38 volts, which should not be construed as a limitation in the disclosure. When the control module 120 determines, in step S209, that the output voltage value Vout is less than or equal to the second threshold and the output voltage value Vout is greater than or equal to the third threshold, the operation procedure turns to step S210.

In step S210, the power conversion device 100 adjusts the duty cycle of the second control signal CS2 to the second duty cycle by using the control module 120. In the present embodiment, the second duty cycle may be generated by using the operation unit 124 of the control module 120. In other words, the second duty cycle is generated by the second duty cycle generator 402 according to the foregoing formula (2). After the power conversion device 100 adjusts the duty cycle of the second control signal CS2 to the second duty cycle, the operation procedure turns to step S204. In step S204, the power conversion device 100 provides, by using the control module 120, the second control signal CS2 having the second duty cycle. In addition, the control module 120 generates the first control signal CS1 to disconnect the first path 112.

Based on the operation procedure of the foregoing steps S202, S209, S210, and S204, the power conversion device 100 times, in step S205, a duration for which the second control signal CS2 is maintained to be in the second duty cycle, and determines, in step S206 based on a timing result, whether the duration for which the second control signal CS2 is maintained to be in the second duty cycle is greater than or equal to the maintenance duration. When the duration for which the second control signal CS2 is maintained to be in the second duty cycle is greater than or equal to the maintenance duration, it indicates that the foregoing duration has reached the preset maintenance duration. Therefore, the power conversion device 100 stops, in step S207, operation of the second path 114.

In another aspect, in step S206, when the duration for which the second control signal CS2 is maintained to be in the second duty cycle is shorter than (less than) the maintenance duration, it indicates that the foregoing duration has not reached the preset maintenance duration. Therefore, when the duration for which the second control signal CS2 is maintained to be in the second duty cycle is shorter than the maintenance duration, the operation procedure turns to step S208.

Return to step S209. If the input voltage value Vin received by the path module 110 is less than the first threshold and the boosting operation is not performed for the first time, when the control module 120 determines, in step S209, that the output voltage value Vout is greater than the second threshold or the output voltage value Vout is less than the third threshold, the operation procedure turns to step S211. In step S211, the control module 120 provides a compensation value. Implementation details about providing the compensation value may be sufficiently illustrated by the embodiment of FIG. 5, and therefore are not described herein again. After the control module 120 provides the compensation value, the operation procedure turns to step S212.

In step S212, the power conversion device 100 adjusts the duty cycle of the second control signal CS2 to the second duty cycle by using the control module 120. In the present embodiment, the operation unit 124 of the control module 120 generates the second duty cycle, and compensates for the second duty cycle based on the compensation value to obtain the third duty cycle. After the power conversion device 100 adjusts the duty cycle of the second control signal CS2 to the third duty cycle, the operation procedure turns to step S204. In step S204, the power conversion device 100 provides, by using the control module 120, the second control signal CS2 having the third duty cycle. In this way, through adjusting different duty cycles (that is, the first duty cycle, the second duty cycle, and the third duty cycle) of the second control signal CS2, the output voltage value Vout can be stabilized in a voltage value range. In addition, the control module 120 generates the first control signal CS1 to disconnect the first path 112.

Based on the operation procedure of the foregoing steps S202, S209, S211, S212, and S204, the power conversion device 100 times, in step S205, a duration for which the second control signal CS2 is maintained to be in the third duty cycle, and determines, in step S206 based on a timing result, whether the duration for which the second control signal CS2 is maintained to be in the third duty cycle is greater than or equal to the maintenance duration. When the duration for which the second control signal CS2 is maintained to be in the third duty cycle is greater than or equal to the maintenance duration, it indicates that the foregoing duration has reached the preset maintenance duration. Therefore, the power conversion device 100 stops, in step S207, operation of the second path 114.

In another aspect, in step S206, when the duration for which the second control signal CS2 is maintained to be in the third duty cycle is shorter than (less than) the maintenance duration, it indicates that the foregoing duration has not reached the preset maintenance duration. Therefore, when the duration for which the second control signal CS2 is maintained to be in the third duty cycle is shorter than the maintenance duration, the operation procedure turns to step S208.

Figure 7:
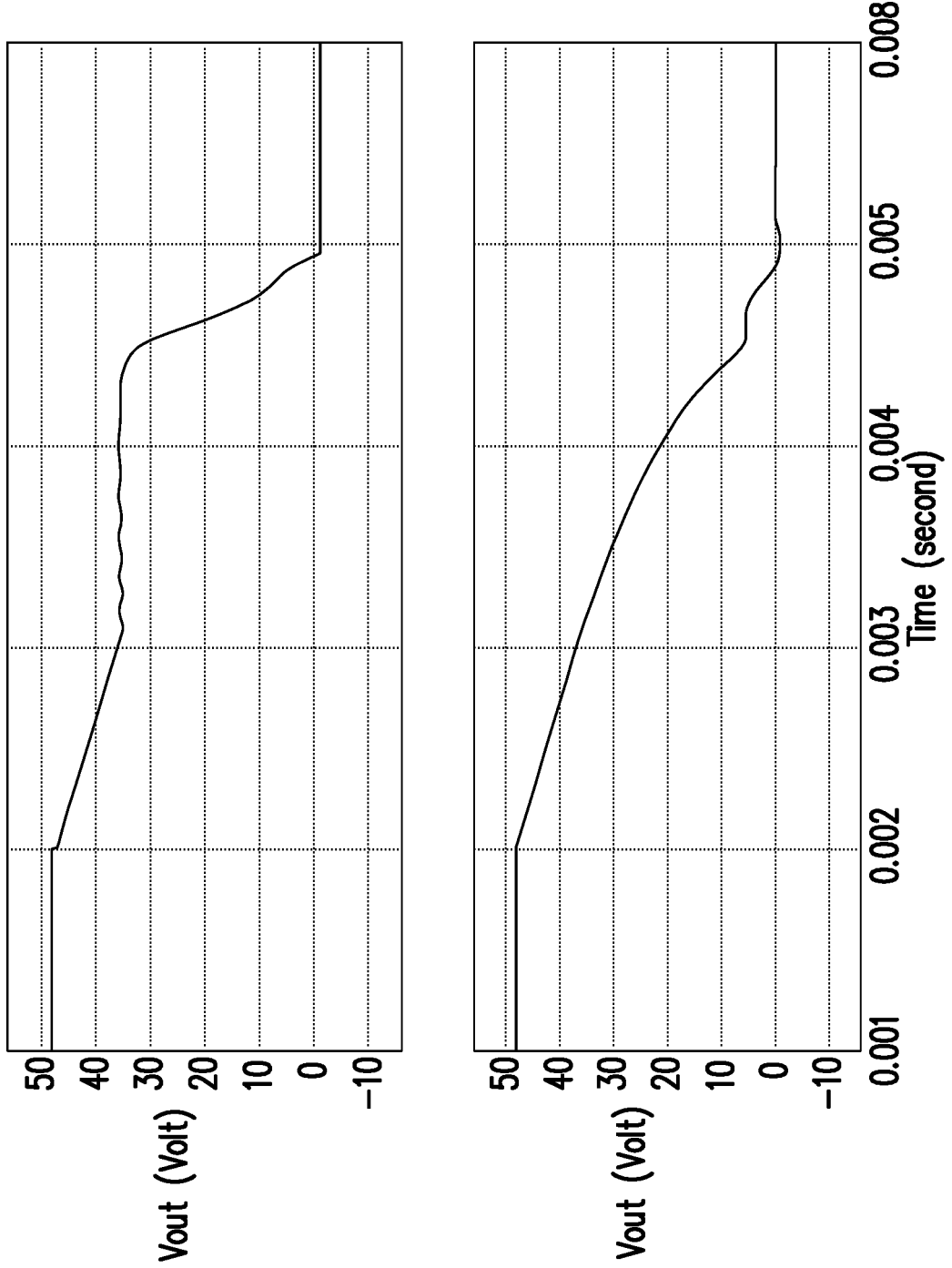
FIG. 7 is a schematic waveform diagram of an input voltage value and an output voltage value according to an embodiment of the disclosure.

Referring to FIG. 2, FIG. 6, and FIG. 7 together, FIG. 7 is a schematic waveform diagram of an input voltage value and an output voltage value according to an embodiment of the disclosure. In the present embodiment, based on the operation procedure in FIG. 6, when the input voltage value Vin decreases from 48 volts to 36 volts, the power conversion device 100 may perform, based on steps S201 to S204 of the operation procedure, the boosting operation for the first time on the output voltage value Vout shown in FIG. 7. Subsequently, the power conversion device 100 performs the boosting operation based on steps S209 to S212 and step S204 of the operation procedure. In this way, the output voltage value Vout can be stabilized in a voltage value range (between 35 volts and 37 volts). In addition, once the duration for which the second control signal CS2 is maintained to be in the first duty cycle, the second duty cycle, or the third duty cycle is greater than or equal to the maintenance duration, or the input voltage value Vin decreases to be less than the fourth threshold, the boosting operation is stopped.

Based on the above, when the input voltage value of the input power received by the power conversion device in the disclosure is less than the first threshold, the first control signal is generated to interrupt the first path to stop outputting the input power. The duty cycle of the second control signal is adjusted based on the input voltage value and the output voltage value. In this way, the power conversion device is capable of stably outputting the output voltage value in a voltage value range when the input voltage value decreases.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power conversion device, comprising:
   a path module, configured to receive an input power and provide an output power, and comprising:
      a first path; and
      a second path, connected to the first path in parallel; and
   a control module, coupled to the path module, and configured to detect the input power and the output power and generate, based on at least two of an input voltage value and an input current value of the input power and an output voltage value of the output power, a first control signal for controlling the first path and a second control signal for controlling the second path, wherein the first path and the second path are not simultaneously conducted, wherein
   when the input voltage value received by the path module is less than a first threshold and a boosting operation is performed for the first time, the control module generates the first control signal to interrupt the first path to stop outputting the input power, and adjusts a duty cycle of the second control signal to a first duty cycle based on at least the input current value and the input voltage value, so as to stabilize the output voltage value, when a duration for which the duty cycle of the second control signal is maintained to be the first duty cycle is greater than or equal to a maintenance duration, the control module adjusts the second control signal to stop operation of the second path, when the input voltage value received by the path module is less than the first threshold and the boosting operation is not performed for the first time, the control module determines the output voltage value, and when the control module determines that the output voltage value is less than or equal to a second threshold and is greater than or equal to a third threshold, the control module generates the first control signal to interrupt the first path to stop outputting the input power, and adjusts the duty cycle of the second control signal to a second duty cycle based on at least the input voltage value and the output voltage value, so as to stabilize the output voltage value, wherein the second threshold is greater than the third threshold, and when a duration for which the duty cycle of the second control signal is maintained to be the second duty cycle is greater than or equal to the maintenance duration, the control module adjusts the second control signal to stop operation of the second path.

2. The power conversion device according to claim 1, wherein when the input voltage value received by the path module is less than the first threshold and the boosting operation is not performed for the first time, the control module determines the output voltage value, and when the control module determines that the output voltage value is greater than the second threshold or is less than the third threshold, the control module generates the first control signal to interrupt the first path to stop outputting the input power, and adjusts the duty cycle of the second control signal to a third duty cycle based on at least the input voltage value, the output voltage value, and a compensation value associated with the output voltage value, so as to stabilize the output voltage value, wherein when a duration for which the duty cycle of the second control signal is maintained to be the third duty cycle is greater than or equal to the maintenance duration, the control module adjusts the second control signal to stop operation of the second path.

3. The power conversion device according to claim 2, wherein the first path comprises:
a switch element, wherein a first end of the switch element is configured to receive the input power, a second end of the switch element is configured to provide the output power, a control end of the switch element is configured to receive the first control signal, and the switch element is switched on or off based on the first control signal, and the second path comprises:
a boost circuit, connected to the switch element in parallel, and configured to operate based on the duty cycle of the second control signal.

4. The power conversion device according to claim 3, wherein the boost circuit comprises:
a boost inductor, wherein a first end of the boost inductor is coupled to the first end of the switch element;
a boost diode, wherein an anode of the boost diode is coupled to a second end of the boost inductor, and a cathode of the boost diode is coupled to the second end of the switch element; and
a boost switch, wherein a first end of the boost switch is coupled to the anode of the boost diode, a second end of the boost switch is coupled to a reference low potential, and a control end of the boost switch is configured to receive the second control signal.

5. The power conversion device according to claim 4, wherein the control module comprises:
a detection unit, configured to detect the input power and the output power to obtain the input voltage value, the input current value, and the output voltage value; and
an operation unit, configured to calculate the first duty cycle, the second duty cycle, and the third duty cycle based on at least two of the input voltage value, the input current value, and the output voltage value, and generate the first control signal based on the input voltage value.

6. The power conversion device according to claim 5, wherein the operation unit performs a multiplication operation on the input current value and an inductance value of the boost inductor to obtain an operation result, and performs a division operation on the operation result and the input voltage value to obtain the first duty cycle.

7. The power conversion device according to claim 5, wherein the operation unit performs a division operation on a constant value of the input voltage value and a constant value of the output voltage value to obtain an input-output ratio, and subtracts the input-output ratio from 1 to obtain the second duty cycle.

8. The power conversion device according to claim 5, wherein the operation unit comprises:
a compensation unit, configured to generate an error value based on the output voltage value and a reference voltage value, perform a multiplication operation on the error value and a proportional parameter to obtain a proportional value, perform a multiplication operation on the error value and an integral parameter to obtain an operation value, accumulate the operation value over time to obtain an integral value, and add the proportional value and the integral value to provide the compensation value.

9. The power conversion device according to claim 8, wherein the operation unit compensates the second duty cycle based on the compensation value to obtain the third duty cycle.

* * * * *